United States Patent
Ross et al.

(10) Patent No.: US 9,111,005 B1
(45) Date of Patent: Aug. 18, 2015

(54) SYSTEMS AND METHODS FOR CONFIGURING AND CONTROLLING VARIABLE PRESSURE AND VARIABLE DISPLACEMENT SENSOR OPERATIONS FOR INFORMATION HANDLING SYSTEMS

(71) Applicants: Carlos Ross, Miami, FL (US); Danae Sierra, Miami, FL (US)

(72) Inventors: Carlos Ross, Miami, FL (US); Danae Sierra, Miami, FL (US)

(73) Assignee: Dell Products LP, Round Rock, TX (US)

( * ) Notice: Subject to any disclaimer, the term of this patent is extended or adjusted under 35 U.S.C. 154(b) by 0 days.

(21) Appl. No.: 14/209,382

(22) Filed: Mar. 13, 2014

(51) Int. Cl.
G06F 3/00 (2006.01)
G06F 11/30 (2006.01)

(52) U.S. Cl.
CPC ........ *G06F 11/3089* (2013.01); *G06F 11/3051* (2013.01)

(58) Field of Classification Search
None
See application file for complete search history.

(56) References Cited

U.S. PATENT DOCUMENTS

| | | | |
|---|---|---|---|
| 3,936,674 A | 2/1976 | Hughes | |
| 4,291,201 A | 9/1981 | Johnson et al. | |
| 4,302,011 A | 11/1981 | Pepper, Jr. | |
| 4,303,811 A | 12/1981 | Parkinson | |
| 4,334,134 A | 6/1982 | Janda | |
| 4,449,024 A | 5/1984 | Stracener | |
| 4,527,250 A | 7/1985 | Galdun et al. | |
| 4,733,590 A | 3/1988 | Watanabe | |
| 4,850,591 A | 7/1989 | Takezawa et al. | |
| 4,896,069 A | 1/1990 | Rosenberg et al. | |
| 4,899,631 A | 2/1990 | Baker | |
| 4,977,298 A | 12/1990 | Fujiyama | |
| 5,220,318 A | 6/1993 | Staley | |
| 5,252,798 A | 10/1993 | Kamada | |
| 5,285,037 A | 2/1994 | Baranski et al. | |
| 5,408,060 A | 4/1995 | Muurinen | |
| 5,434,566 A | 7/1995 | Iwasa et al. | |
| 5,450,078 A | 9/1995 | Silva et al. | |
| 5,736,976 A * | 4/1998 | Cheung | 345/168 |
| 5,909,211 A | 6/1999 | Combs et al. | |
| 6,007,209 A | 12/1999 | Pelka | |
| 6,102,802 A | 8/2000 | Armstrong | |
| 6,135,886 A | 10/2000 | Armstrong | |
| 6,275,138 B1 | 8/2001 | Maeda | |
| 6,400,285 B1 * | 6/2002 | Gifford | 341/22 |
| 6,559,399 B2 | 5/2003 | Hsu et al. | |
| 6,608,271 B2 | 8/2003 | Duarte | |

(Continued)

OTHER PUBLICATIONS

Texas Instruments, "MSP430 Capacitive Single-Touch Sensor Design Guide", Application report, SLAA379, Jan. 2008, 19 pgs.

(Continued)

*Primary Examiner* — Elias Mamo
(74) *Attorney, Agent, or Firm* — Egan, Peterman & Enders LLP.

(57) ABSTRACT

Systems and methods are disclosed that may be implemented to allow a user and/or a software entity to define particular variable pressure or variable pressure or displacement sensor (VPD) system configurations to achieve a desired system functionality as a function of varying key pressure or varying displacement applied to one or more sensors, such as VPD keys of a keyboard or other VPD sensors such as game controller or mouse buttons, etc. The disclosed systems and methods may be implemented using these defined VPD system configurations to control interaction between VPD subsystem hardware components and software application/s of interest that are executing on a host processing device of an information handling system.

26 Claims, 8 Drawing Sheets

(56) References Cited

U.S. PATENT DOCUMENTS

| | | | |
|---|---|---|---|
| 6,684,166 B2 | 1/2004 | Bellwood et al. |
| 6,747,226 B2 | 6/2004 | Watanabe |
| 6,747,867 B2 | 6/2004 | Hsu |
| 6,758,615 B2 | 7/2004 | Monney et al. |
| 6,860,612 B2 | 3/2005 | Chiang et al. |
| 6,883,985 B2 | 4/2005 | Roberson |
| 6,918,677 B2 | 7/2005 | Shipman |
| 7,059,790 B2 | 6/2006 | Risheq |
| 7,106,305 B2 | 9/2006 | Rosenberg |
| 7,123,241 B2 | 10/2006 | Bathiche |
| 7,244,898 B2 | 7/2007 | Kim |
| 7,256,768 B2 | 8/2007 | Bathiche |
| 7,335,844 B2 | 2/2008 | Lee et al. |
| 7,394,033 B2 | 7/2008 | Kim |
| 7,655,901 B2 | 2/2010 | Idzik et al. |
| 7,667,371 B2 | 2/2010 | Sadler et al. |
| 7,688,310 B2 | 3/2010 | Rosenberg |
| 7,741,979 B2 | 6/2010 | Schlosser et al. |
| 7,772,987 B2 | 8/2010 | Shows |
| 7,786,395 B2 | 8/2010 | Ozias et al. |
| 8,159,461 B2 | 4/2012 | Martin et al. |
| 8,217,892 B2 | 7/2012 | Meadors |
| 8,224,391 B2 | 7/2012 | Kim et al. |
| 8,307,222 B2 | 11/2012 | Wang et al. |
| 8,411,029 B2 | 4/2013 | Casparian et al. |
| 8,502,094 B2 | 8/2013 | Chen |
| 2002/0084721 A1 | 7/2002 | Walczak |
| 2003/0072595 A1 | 4/2003 | Al-Safar |
| 2003/0122779 A1 | 7/2003 | Martin et al. |
| 2003/0210233 A1 | 11/2003 | Frulla |
| 2004/0027385 A1 | 2/2004 | Rekimoto et al. |
| 2004/0104893 A1 | 6/2004 | Huang |
| 2004/0174200 A1 | 9/2004 | McNutt |
| 2004/0183783 A1 | 9/2004 | Rojas et al. |
| 2005/0057514 A1 | 3/2005 | Bathiche |
| 2005/0057515 A1 | 3/2005 | Bathiche |
| 2005/0073446 A1 | 4/2005 | Lazaridis et al. |
| 2006/0022951 A1 | 2/2006 | Hull |
| 2006/0148564 A1 | 7/2006 | Herkelman |
| 2006/0277466 A1 | 12/2006 | Anderson |
| 2007/0065215 A1 | 3/2007 | Brown |
| 2007/0227256 A1 | 10/2007 | Wright |
| 2007/0235307 A1 | 10/2007 | Liao et al. |
| 2007/0285393 A1 | 12/2007 | Ishakov |
| 2008/0001787 A1 | 1/2008 | Smith et al. |
| 2008/0092087 A1 | 4/2008 | Brown et al. |
| 2008/0179172 A1 | 7/2008 | Sellers |
| 2008/0251364 A1 | 10/2008 | Takala et al. |
| 2008/0309631 A1 | 12/2008 | Westerman et al. |
| 2009/0007758 A1 | 1/2009 | Schlosser et al. |
| 2009/0079612 A1 | 3/2009 | Parfitt |
| 2009/0127084 A1 | 5/2009 | Ozias et al. |
| 2009/0140985 A1 | 6/2009 | Liu |
| 2009/0178913 A1 | 7/2009 | Peterson et al. |
| 2009/0189790 A1 | 7/2009 | Peterson et al. |
| 2009/0189873 A1 | 7/2009 | Peterson et al. |
| 2009/0207055 A1 | 8/2009 | Aull et al. |
| 2009/0278792 A1* | 11/2009 | Toebes et al. ................. 345/156 |
| 2010/0027854 A1 | 2/2010 | Chatterjee et al. |
| 2010/0089735 A1 | 4/2010 | Takeda et al. |
| 2010/0090813 A1 | 4/2010 | Je et al. |
| 2010/0090814 A1 | 4/2010 | Cybart et al. |
| 2010/0090957 A1 | 4/2010 | Idzik et al. |
| 2010/0117809 A1 | 5/2010 | Dai et al. |
| 2010/0148999 A1 | 6/2010 | Casparian et al. |
| 2010/0182241 A1 | 7/2010 | Rosenberg |
| 2010/0205803 A1 | 8/2010 | Lipton et al. |
| 2010/0253552 A1 | 10/2010 | Mendez et al. |
| 2010/0288607 A1 | 11/2010 | Ozias et al. |
| 2010/0321301 A1 | 12/2010 | Casparian et al. |
| 2011/0078470 A1 | 3/2011 | Wang et al. |
| 2011/0095877 A1 | 4/2011 | Casparian et al. |
| 2011/0102325 A1 | 5/2011 | Sato et al. |
| 2011/0102326 A1 | 5/2011 | Casparian et al. |
| 2011/0102340 A1 | 5/2011 | Martin et al. |
| 2012/0298491 A1 | 11/2012 | Ozias et al. |
| 2013/0067126 A1 | 3/2013 | Casparian et al. |
| 2013/0100028 A1 | 4/2013 | Mahowald et al. |
| 2013/0178292 A1 | 7/2013 | Casparian et al. |
| 2014/0082236 A1 | 3/2014 | Zhang et al. |
| 2014/0105664 A1* | 4/2014 | Hoyos .......................... 400/472 |
| 2014/0253454 A1* | 9/2014 | Caldwell ....................... 345/168 |

OTHER PUBLICATIONS

Cypress Semiconductor Corporation, Cypress Perform, "*CY8C21634, CY8C21534, CY8C21434, CY8C21334, CY8C2123; PSoC® Mixed-Signal Array*," Apr. 18, 2008, Document No. 38-12025 Rev. M, 43 pgs.

Logitech, "Logitech Gaming Keyboard G510", Printed from Internet Aug. 25, 2011, 3 pgs.

Saitek, "Saitek Pro Gamer Command Unit", Feb. 27, 2011, 7 pgs.

Saitek, "Saitek Pro Gamer Command Unit", Dec. 6, 2005, 41 pgs.

Cherry Corporation, MX Series Key Switch, Obtained From Internet Aug. 12, 2013, 9 pgs.

Cherry Corporation, Keymodule MX, Obtained from Internet Jul. 25, 2013, 2 pgs.

The Keyboard Company, An Introduction to Cherry MX Mechanical Switches, Obtained from Internet Jul. 25, 2013, 7 pgs.

Liendo et al., "Systems and Methods for Executable File Identity Capture During Indirect Application Launch", U.S. Appl. No. 14/182,647, filed Feb. 18, 2014, DELL:177, 27 pgs.

Casparian et al., "Systems and Methods for Implementing Spring Loaded Mechanical Key Switches With Variable Displacement Sensing:", U.S. Appl. No. 14/013,724, filed Aug. 29, 2013, DELL:167, 57 pgs.

Casparian et al., "Systems and Methods for Lighting Spring Loaded Mechanical Key Switches", U.S. Appl. No. 14/013,603, filed Aug. 29, 2013, DELL:169, 59 pgs.

* cited by examiner

OUT report format:

| 0x01 | Sensor | 0 | 0 | 0 | 0 | 0 |
|---|---|---|---|---|---|---|
| 402 | 404 | 406 | 408 | 410 | 412 | 414 | 416 |

*FIG. 4*

OUT report format:

| 0x02 | Sensor | Ranges | #1 | Min MSB | Min LSB | Max MSB | Max LSB |
|---|---|---|---|---|---|---|---|
| Mod | Key or Other Sensor Code | Rate | #2 | ... | ... | ... | ... |

OUT report format:

| 0x03 | Sensor | Ranges | #1 | Min MSB | Min LSB | Max MSB | Max LSB |
|---|---|---|---|---|---|---|---|
| Mod | Key or Other Sensor Code | #2 | ... | ... | ... | ... | ... |

OUT report format:

| 0x05 | Sensor | 0 | 0 | 0 | 0 | 0 | 0 |
|------|--------|---|---|---|---|---|---|
| 802  | 804    | 806 | 808 | 810 | 812 | 814 | 816 |

IN report format:

| 0x85 | Sensor | Mode | 0 | 0 | 0 | 0 | 0 |
|------|--------|------|---|---|---|---|---|
| 852  | 854    | 856  | 858 | 860 | 862 | 864 | 866 |

FIG. 9

OUT report format:

| 0x06 | 0 | 0 | 0 | 0 | 0 | 0 | 0 |
|------|---|---|---|---|---|---|---|
| 902  | 904 | 906 | 908 | 910 | 912 | 914 | 916 |

IN report format:

| 0x84 | MSB | LSB | 0 | 0 | 0 | 0 | 0 |
|------|-----|-----|---|---|---|---|---|
| 952  | 954 | 956 | 958 | 960 | 962 | 964 | 966 |

OUT report format:

| 0x07 | 0 | 0 | 0 | 0 | 0 | 0 | 0 |
|---|---|---|---|---|---|---|---|
| 1002 | 1004 | 1006 | 1008 | 1010 | 1012 | 1014 | 1016 |

FIG. 10

OUT report format:

| 0x08 | Mode | 0 | 0 | 0 | 0 | 0 | 0 |
|---|---|---|---|---|---|---|---|
| 1102 | 1104 | 1106 | 1108 | 1110 | 1112 | 1114 | 1116 |

FIG. 11

OUT report format:

| 0x09 | 0 | 0 | 0 | 0 | 0 | 0 | 0 |
|---|---|---|---|---|---|---|---|
| 1202 | 1204 | 1206 | 1208 | 1210 | 1212 | 1214 | 1216 |

1200

IN report format:

| 0x89 | Key or Other Sensor Code | 0 | 0 | 0 | 0 | 0 | 0 |
|---|---|---|---|---|---|---|---|
| 1252 | 1254 | 1256 | 1258 | 1260 | 1262 | 1264 | 1266 |

OUT report format:

| 0x0A | 0 | 0 | 0 | 0 | 0 | 0 | 0 |
|---|---|---|---|---|---|---|---|
| 1302 | 1304 | 1306 | 1308 | 1310 | 1312 | 1314 | 1316 |

SYSTEMS AND METHODS FOR CONFIGURING AND CONTROLLING VARIABLE PRESSURE AND VARIABLE DISPLACEMENT SENSOR OPERATIONS FOR INFORMATION HANDLING SYSTEMS

FIELD OF THE INVENTION

This application relates to pressure sensitive sensors and, more particularly, to systems and methods for configuration and control of variable pressure and variable displacement sensors for information handling systems.

BACKGROUND OF THE INVENTION

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems use keyboards to obtain user input. Some prior keyboard solutions have provided pressure sensitive keys. The most common technique to provide pressure sensitive keys is to use variable resistance sensing techniques to provide an indication of the pressure applied by a user to a key. Variable capacitance sensing has also been utilized in some prior art products such as console gamepad controllers.

Computer games are examples of applications that are run on information handling systems in conjunction with gaming control centers such as the Alienware Command Center (AWCC) available from Dell Computer of Round Rock, Tex. Such gaming control centers include separate user-accessible applications that are often provided on an information handling system to monitor direct launching of game applications, and to allow a user to associate specific system user-defined system configurations and actions with a particular directly-launched game. Once the user selects a game to create a new game mode, a profile configurator is provided as a software component of a gaming control center that is responsible for saving the game configuration settings and actions that will be associated with the game/application. Examples of specific user-defined system configurations that may be saved and linked to a particular game include specific keyboard and mouse lighting settings, audio output settings, power management settings, performance monitoring recording settings, designated keyboard macros and/or variable pressure key settings and/or macros, etc. Every time a particular game is directly launched by the user, a component in the gaming control center recognizes that the game has been directly-launched and responds by applying the specific user-defined system configurations to the corresponding system components for as long as the game remains active and running. The gaming control center recognizes when the particular directly-launched game is closed and responds by reverting to the default (non-game) system configurations.

SUMMARY OF THE INVENTION

Systems and methods are disclosed herein that may be implemented to allow a user and/or a software entity (e.g., such as a gaming control center application or other hosted application executing above an operating system) to define particular variable pressure or displacement sensor (VPD) system configurations to achieve a desired system functionality (e.g., behavior) as a function of varying key pressure or varying displacement applied to one or more sensors, such as VPD keys of a keyboard or other VPD sensors such as game controller or mouse buttons, etc. The disclosed systems and methods may be implemented using these defined VPD system configurations to control interaction between VPD subsystem components (e.g., embedded non-volatile VPD hardware layer) and software application/s of interest (e.g., such as gaming applications) that are executing on a host processing device of an information handling system. In one exemplary embodiment, a host processing device may be configured to execute a software entity (e.g., such as a gaming control center application or a hosted user application) to use a VPD application programming interface (API) assigned to the software entity to interact with underlying VPD hardware subsystem components using a disclosed packet-based VPD communication protocol.

In another exemplary embodiment, a host processing device may be configured to execute a VPD protocol-enabled application (e.g., gaming application or other type of VPD-compatible application) together with a VPD API assigned to the user application to discover the presence of an underlying VPD protocol-enabled hardware subsystem on the same information handling system, e.g., through a search for assigned USB vendor identification and product identification using OS-specific conventions. Upon discovery of the presence of a VPD hardware subsystem, the processing device may then use its assigned VPD API to attach itself to components of the VPD hardware subsystem (e.g., establish knowledge and communications with the VPD hardware subsystem) so that it is capable of both sending configuration commands and requests for VPD-based data and of receiving raw sensor data or status information through the VPD API using a packet-based VPD communication protocol. The previously described steps of VPD hardware subsystem discovery and VPD hardware subsystem attachment may be implemented by a VPD protocol-enabled application automatically or upon user command. In any case, the disclosed systems and methods may be implemented to allow a VPD protocol-enabled application (e.g., such as a third party gaming application or other type of application) to be pre-configured for automatic discovery of, and operation with, a VPD hardware subsystem of an information handling system. Such a VPD hardware subsystem may in turn include VPD circuitry that is coupled to receive variable pressure or displacement sensor signals from VPD keys of a keyboard or other types of VPD sensors, such as game controller buttons, mouse buttons, etc.

The disclosed systems and methods may be implemented in one exemplar embodiment by multiple processing devices to communicate with each other using a VPD protocol that embodies a set of commands and parameters that are passed by an API executing on a first host processing device to enabling embedded software or firmware running in a hardware layer of a VPD subsystem that is implemented by a separate processing device, such as a VPD microcontroller. In such an embodiment, the disclosed VPD protocol may be so implemented in the embedded non-volatile software or firmware, and may be provided as an integral component of the VPD hardware subsystem. Using this architecture and protocol, hosted applications using the API may allow users to configure VPD sensors of a VPD-enabled keyboard or other VPD button controls to interact with other applications in a more convenient and advantageous manner.

In one embodiment, a VPD protocol may be implemented by one or more processing devices to offer flexible options for defining VPD system configurations to allow a user to interact with one or more hosted application/s in various ways by controlling a manner in which the hosted applications react to detected VPD pressure or displacement levels. For example, a user and/or hosted application may be allowed to define particular variable pressure or displacement sensor (VPD) system configurations for hardware components of a VPD subsystem without requiring communication of this configuration information through an operating system (OS) layer and/or through any processing entities (e.g. such as device drivers) that are executing within an operating system (OS) layer on the host system between the user or hosted application, and the underlying VPD hardware subsystem components. In one exemplary embodiment, a VPD protocol may be implemented to allow VPD system configuration information to be passed directly from a hosted application through a VPD application programming interface (API) to underlying VPD hardware components, and/or to allow pressure or displacement-based scan or key codes to be passed directly from underlying VPD hardware components back to a hosted application through the VPD API. In one exemplary embodiment, no OS drivers may be present and/or involved in the VPD configuration process, nor in the response of a VPD subsystem to particular pressure or displacement levels received from VPD sensors such as VPD keys.

In another exemplary embodiment, a VPD protocol may be provided to allow a gaming control center and/or other hosted application running within an application layer running on top of an OS layer to interact using the VPD protocol with underlying hardware component/s of a VPD subsystem. Such underlying component/s of a VPD hardware subsystem may include, for example, a hardware layer (e.g., including one or more micro-controllers or other processing devices) embedded below the OS and that is coupled to receive analog output signals representative of the pressure or displacement applied to individual depressed VPD sensors and to in turn provide pressure or displacement-based scan or key codes to an USB OS driver that correspond to a particular combination of the key identity and real time specific pressure or displacement applied to individual depressed analog sensors or keys. One or more optional middleware layer component/s may also be provided that are configured to receive pressure or displacement-based scan or key codes from the USB OS driver and provide modified VPD scan or key codes back to a hosted user application.

In the practice of the disclosed systems and methods, a VPD protocol may be configured to allow a hosted application (e.g., under control of a user) to communicate particular defined VPD sensor configuration information (e.g., variable pressure or displacement key settings) to underlying VPD hardware subsystem components in order to specify desired or customized system functionality or behavior that occurs in response to output signals received from particular variable pressure or displacement sensor/s or key/s. Underlying VPD hardware layer components, such as a VPD microcontroller, may also be configured in one exemplary embodiment to utilize the disclosed VPD protocol to communicate individual VPD key pressure or displacement level information and other information back to one or more user applications.

In another exemplary embodiment, multiple processing devices of an information handling system may be configured to communicate data and control information back and forth between one or more hosted applications and VPD hardware subsystem components (with or without OS involvement or presence) using a VPD protocol that includes a command repertoire which allows configuring of individual VPD-enabled sensors (e.g., such as keyboard keys and/or buttons) in any combination of multiple (e.g., three) modes of operation when these controls are activated by the user. The multiple processing devices may be further configured to implement a VPD protocol that includes auxiliary commands to request and receive the current VPD system configuration (e.g., pressure-based or displacement-based behavior) defined for individual VPD sensors, and to request and receive the real-time raw pressure or displacement sensing data generated as the user puts varying pressure or displacement on a selected VPD control.

In one respect, disclosed herein is an information handling system, including: variable pressure or displacement (VPD) circuitry that includes a first processing device configured to receive a sensor output signal from at least one VPD sensor that includes raw sensor data that is representative of the real time pressure or displacement being applied to the VPD sensor, the first processing device being configured to process the raw sensor date of the received VPD sensor output signal according to VPD configuration parameters to produce at least one VPD circuitry output signal that is based on an identity and a real time level of pressure or displacement being applied to the VPD sensor; and a second processing device that is configured as a host processing device to execute at least one application to exchange information and data with the first processing device using bi-directional packet-based communications that are not made available to or reported to an operating system (OS) executing on the host processing device. The second processing device may be configured to execute the at least one application to use the packet-based communications to communicate VPD commands to the first processing device that request the first processing device to take one or more reporting or processing actions, and to use the packet-based communications to communicate VPD configuration instructions to the first processing device to control the manner in which the first processing device processes the raw sensor date of the received VPD sensor output signal. The first processing device may be configured to use the packet-based communications to communicate the raw sensor data of the VPD sensor output signal to the application executing on the second processing device, and to use the packet-based communications to communicate current VPD configuration status information to the application executing on the second processing device.

In another respect, disclosed herein is a method of operating an information handling system, including: receiving a sensor output signal in a first processing device of variable pressure or displacement (VPD) circuitry from at least one VPD sensor that includes raw sensor data that is representative of the real time pressure or displacement being applied to the VPD sensor; and using the first processing device to process the raw sensor date of the received VPD sensor output signal according to VPD configuration parameters to produce at least one VPD circuitry output signal that is based on an identity and a real time level of pressure or displacement being applied to the VPD sensor. The method may also include using a second processing device that is configured as a host processing device to execute at least one application to: exchange information and data with the first processing device using bi-directional packet-based communications that are not made available to or reported to an operating system (OS) executing on the host processing device, use the packet-based communications to communicate VPD commands to the first processing device that request the first processing device to take one or more reporting or processing actions, and use the packet-based communications to communicate VPD configuration instructions to the first processing device to control the manner in which the first processing device processes the raw sensor date of the received VPD sensor output signal. The method may also include using the first processing device to use the packet-based communications to: communicate the raw sensor data of the VPD sensor output signal to the application executing on the second processing device, and communicate current VPD configuration status information to the application executing on the second processing device.

BRIEF DESCRIPTION OF THE DRAWINGS

FIG. 4 illustrates a VPD protocol packet format according to one exemplary embodiment of the disclosed systems and methods.

FIG. 5 illustrates a VPD protocol packet format according to one exemplary embodiment of the disclosed systems and methods.

FIG. 6 illustrates a VPD protocol packet format according to one exemplary embodiment of the disclosed systems and methods.

FIG. 8 illustrates a VPD protocol packet format according to one exemplary embodiment of the disclosed systems and methods.

FIG. 9 illustrates a VPD protocol packet format according to one exemplary embodiment of the disclosed systems and methods.

FIG. 10 illustrates a VPD protocol packet format according to one exemplary embodiment of the disclosed systems and methods.

FIG. 11 illustrates a VPD protocol packet format according to one exemplary embodiment of the disclosed systems and methods.

FIG. 12 illustrates a VPD protocol packet format according to one exemplary embodiment of the disclosed systems and methods.

FIG. 13 illustrates a VPD protocol packet format according to one exemplary embodiment of the disclosed systems and methods.

DESCRIPTION OF ILLUSTRATIVE EMBODIMENTS

Figure 1:
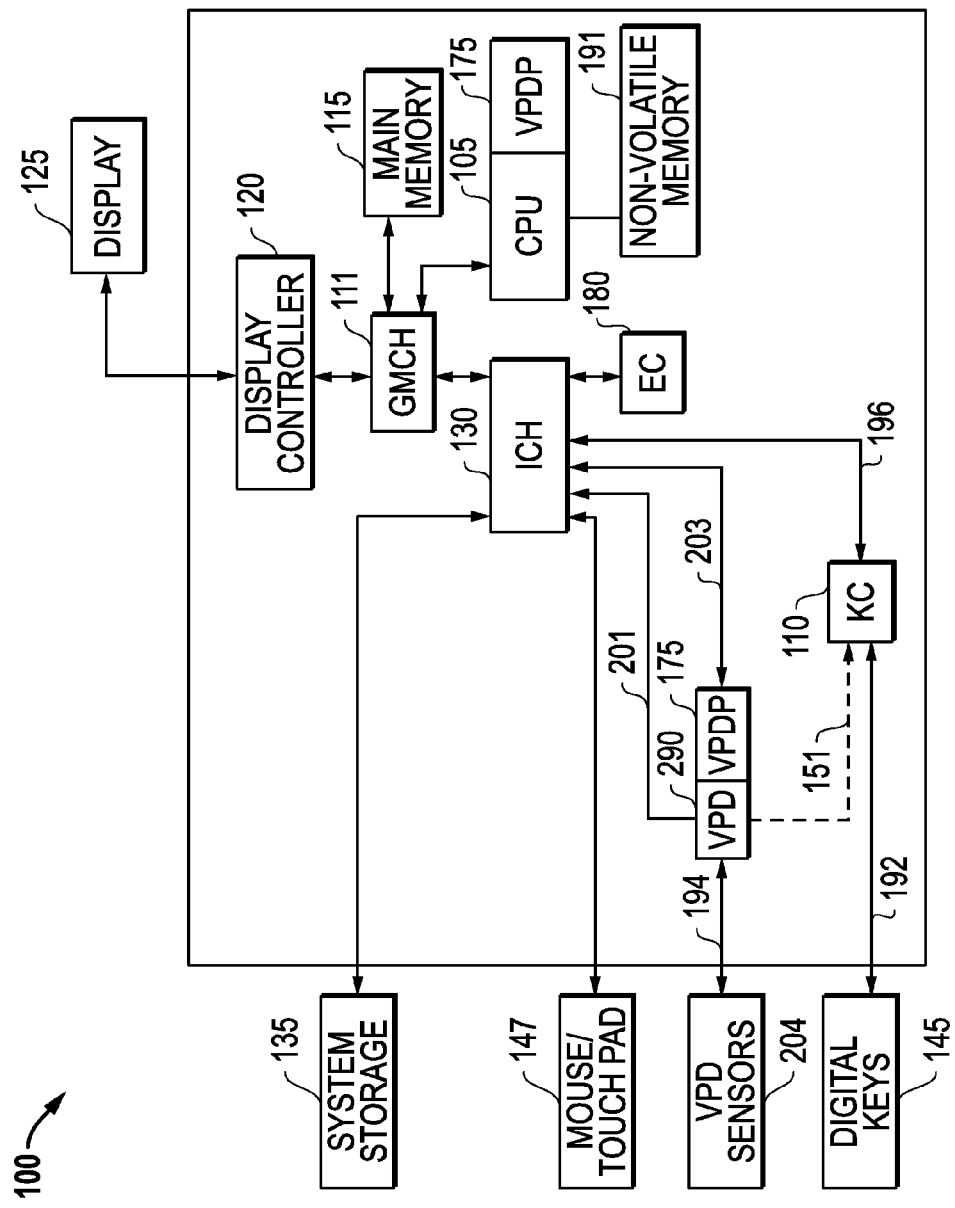
FIG. 1 illustrates a block diagram of an information handling system according to one exemplary embodiment of the disclosed systems and methods.

FIG. 1 is a block diagram of an information handling system 100 as it may be configured according to one exemplary embodiment of the disclosed systems and methods. Information handling system 100 may be, for example, a desktop computer, server, or a portable information handling system such as a notebook computer. As shown in FIG. 1, information handling system 100 of this exemplary embodiment includes a host processing device in the form of CPU 105 such as an Intel Pentium series processor, an Advanced Micro Devices (AMD) processor, or one of many other processing devices currently available. A graphics/memory controller hub (GMCH) chip 111 is coupled to processor 105 to facilitate memory and display functions. System memory 115 and a display controller 120 may be coupled to GMCH 111. A display 125 (e.g., LCD display or other suitable display device) is coupled to display controller 120 to provide visual images to the user. An I/O controller hub (ICH) chip 130 is coupled to GMCH chip 111 to facilitate input/output functions for the information handling system. Local system storage 135 (e.g., one or media drives such as hard disk drive/s, optical drives, etc.) may be coupled to ICH chip 130 to provide permanent system storage for the information handling system. An embedded controller (EC) 180 running system BIOS and system BIOS non-volatile memory 191 are each also coupled to ICH chip 130. It will be understood that other system architectures may be employed, e.g., such as an architecture having a platform controller hub (PCH) coupled to host processor CPU that itself is directly coupled to main memory 115, e.g. with no ICH 130 or GMCH 111. In such an architecture, a PCH may be coupled between the CPU 105 and various input/outputs, including signal paths 201 and 203 of VPDP circuitry 290, signal path 196 of digital on/off controller 110, and display 125.

Still referring to FIG. 1, VPD sensors 204 and digital (on/off) sensors (e.g., keys) 145 of a keyboard input device along with other optional input devices (e.g., such as mouse and/or touchpad 147) are also coupled to ICH chip 130 to enable the user to interact with the information handling system. In this exemplary embodiment digital sensors 145 are illustrated as coupled to provide a digital output signal 192 from optional momentary on digital sensors 145 to optional digital (e.g., legacy) keyboard controller (KC) 110, which may in turn provide scan or key code signals 196 corresponding to individual depressed digital on/off sensors 145 to an appropriate device driver (e.g., PS2 keyboard device driver) executing on CPU 105. In this regard, KC 110 may poll all the momentary on digital sensors (e.g., in a matrix of digital keys 145) and broadcast a scan or key code output corresponding to any pressed digital on/off sensor 145 to the operating system (OS) of information handling system 100. It will be understood that in one embodiment, KC 110 may be implemented by EC 180, rather than by a separate microcontroller. Alternatively no digital keys 145 and no KC 110 may be present.

In the embodiment of FIG. 1, VPD sensors 204 are also coupled as shown to provide analog output signal/s 194 representative of the pressure or displacement applied to individual depressed VPD keys 204 of key area 145 to VPD circuitry 290, which may include, for example, a VPD controller as described further herein or other suitable VPD-configured processing device. VPD circuitry 290 may in turn produce VPD circuitry output signals 201 (e.g., as respective pressure or displacement-based key codes or other suitable output signals) and provide these key codes 201 to applications 208 (shown in FIGS. 2 and 3), e.g., through an appropriate device driver (e.g., USB Human Interface Device "HID" driver) executing on CPU 105 or in any other suitable manner. As will be described further herein, each of these pressure or displacement-based key codes correspond to a particular combination of the key identity and real time specific pressure or displacement applied to individual depressed analog keys or other type of VPD sensor/s 204. As further shown in FIG. 1, each of host processing device 105 and VPD circuitry 290 (e.g., VPD MCU) is configured to implement packet-based VPD protocol 175 as described further herein for bi-directional communication of VPD information and data, e.g., VPD configuration profile information and/or VPD commands from applications 208 to VPD circuitry 290, VPD raw data from VPD circuitry 290 to applications 208, etc.

It will be understood that the particular configuration of FIG. 1 is exemplary only, and that an information handling system may be configured with fewer, additional or alternative components than those illustrated in FIG. 1, e.g., including a network interface card (wired and/or wireless). It will also be understood that in other embodiments, one or more other types of input devices (e.g., mouse, game controller, etc.) may additionally or alternatively be provided with VPD sensor/s that are coupled to provide VPD analog output signals to VPD circuitry 290 that is representative of the pressure or displacement applied to one or more individual depressed VPD sensor/s.

The disclosed systems and methods may be implemented using pressure-sensitive sensors, such as variable conductance, variable resistance, variable capacitance, variable displacement, etc. sensors. One example of pressure sensitive sensors that may be employed are rubber dome keys (e.g., with conductive half-spheres or half-domes located on the underside of the rubber domes) in combination with a printed circuit board (PCB) or flexible PCB underneath it such that the conductive sphere's surface area contact increases with pressure and thus increases the measurable capacitance of that contact in relationship with a nearby charged trace. Pressure-sensitive sensors may alternatively be variable resistance keys that utilize a sensor material that changes impedance when touched, e.g. by pressure of a user's hand or finger. The disclosed systems and methods may also be implemented using displacement-sensitive sensors, such as sensor including capacitive sensing circuitry, resistive sensing circuitry, optical sensing circuitry, electrical field (E-field) or magnetic field (H-field) change detection circuitry, etc. In this regard, circuitry of a variable displacement sensor may be configured to detect and measure downward and/or upward key travel of a depressable sensor such as a key switch component, and to provide variable displacement signals throughout the entire downward and upward travel range of the depressable key switch component.

Further information on example types of variable pressure sensors (e.g., keys) and associated circuitry, digital key sensors and associated circuitry, and methods and circuitry for sensing and processing signals from the same may be found in U.S. patent application Ser. No. 12/316,703 filed Dec. 16, 2008 (U.S. Publication No. 2010-0148999A1); U.S. patent application Ser. No. 12/802,468 filed Jun. 8, 2010 (U.S. Publication No. 2010-0321301A1); U.S. patent application Ser. No. 12/930,125 filed Dec. 29, 2010 (U.S. Publication No. 2011-0102326A1); U.S. patent application Ser. No. 12/930,118 filed Dec. 29, 2010 (U.S. Publication No. 2011-0095877A1); and U.S. patent application Ser. No. 13/232,707 filed Sep. 14, 2011 (U.S. Publication No. 2013-0067126); and U.S. patent application Ser. No. 14/182,647 filed Feb. 18, 2014, each of which is incorporated herein by reference in its entirety for all purposes. Further information on example types of variable displacement sensors (e.g., keys) and associated circuitry may be found in U.S. patent application Ser. No. 14/013,724 filed Aug. 29, 2013, which is also incorporated herein by reference in its entirety for all purposes.

Figure 2:
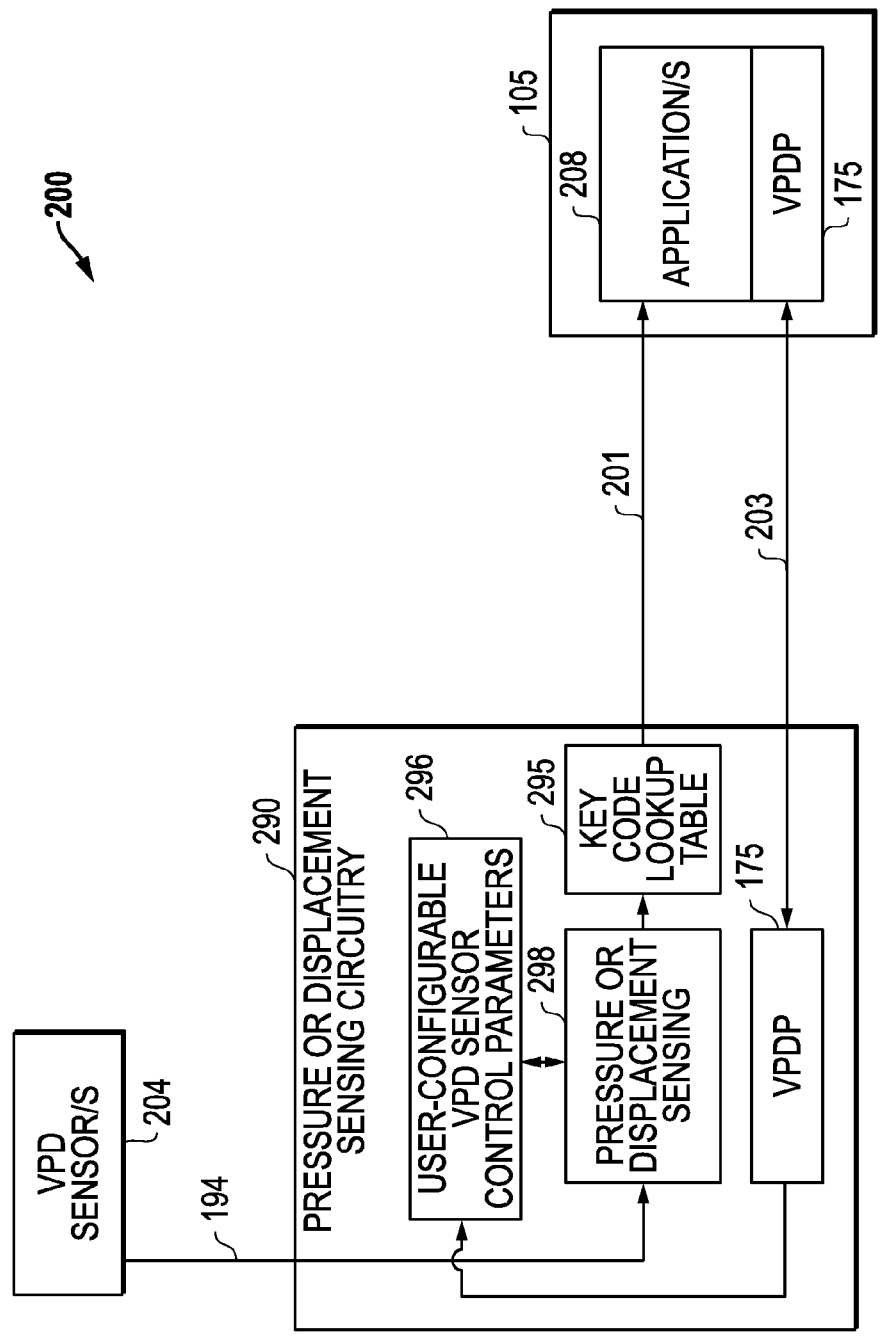
FIG. 2 illustrates a block diagram illustrating information handling system components that include a host system processing device communicatively coupled in operative relationship to a VPD processing device according to one exemplary embodiment of the disclosed systems and methods.

FIG. 2 is a block diagram information handling system components 200 including a host system processing device (e.g., a CPU) 105 communicatively coupled in operative relationship to VPD circuitry 290 (e.g., such as a VPD controller, VPD microcontroller, or other suitable processing device configured to implement VPD operations described herein). As shown, host processing device 105 is configured to execute one or more applications 208 that are executing thereon, and to provide communication between each application and VPD circuitry 290 using packet-based VPD protocol 175. Not shown in FIG. 2 are optional momentary on digital keys and optional legacy keyboard (LK) controller, which may or may not be present.

As further depicted in FIG. 2, VPD circuitry 290 may be coupled to VPD sensor/s 204 that may be part of, for example, a keyboard device body, game controller, mouse, etc. The VPD sensor/s 204 represent sensors that are detected as being depressed by a variable amount or with a variable amount of pressure or displacement. When an VPD sensor 204 is depressed, an analog signal 194 indicating the force or extent to which it is depressed is provided to VPD circuitry 290. VPD circuitry 290 may be provided in one exemplary embodiment as an integrated part of a keyboard device body, game controller, mouse, etc. However, one or more components and/or processing tasks of VPD circuitry 290 may alternatively be integrated or otherwise implemented within a microcontroller that is operating as a keyboard controller 110 and/or as part of a host system to which the keyboard is connected, if desired. One or more of the components of VPD circuitry 290 may also be implemented with external circuitry, as well. Thus, it will be understood that the components and/or processing tasks of VPD circuitry 290 may be implemented by any alternative configuration of one or more processing devices (e.g., controller, microcontroller, processor, microprocessor, ASIC, FPGA, CPU, etc.) of an information handling system or a peripheral component thereof, and alone or together with other types of information handling system processing tasks.

In the embodiment of FIG. 2, VPD circuitry 290 includes a pressure or displacement sensing block 298 that receives an analog signal representative of the pressure or displacement being applied to each of VPD sensors 204, and a key code look up table 295 (e.g., stored in non-volatile memory associated with or otherwise accessible by VPD circuitry 290) that is utilized to select and output a pressure or displacement-based key code 201 corresponding to the particular real-time pressure or displacement being applied to each of VPD sensors 204 to external devices, such as host components of an information handling system, through communication path 201. It will be understood that the particular embodiments illustrated herein are exemplary only, and that the components and function of VPD circuitry 290 may be implemented using any one or more circuitry components suitable for receiving analog signals representative of key pressure or displacement from VPD sensor/s 204, and for selecting and providing in real time key code/s corresponding to the key pressure or displacement applied to each of VPD sensors 204.

In addition, external devices may optionally communicate control and/or other configuration information to the VPD circuitry 290 through communication interface 201. Examples of possible information handling system components may be found described in U.S. patent application Ser. No. 12/586,676, filed Sep. 25, 2009, which is incorporated herein by reference in its entirety.

It is noted that communication path 201 may take a variety of forms. For example, communication path 201 may be a wired communication path or a wireless communication path, as desired. With respect to personal computer systems, such as desktop computers and laptop computers, communication path 201 may be, for example, via a Bluetooth interface if a wireless interface is desired and or a USB (universal serial bus) interface if a wired interface is desired. However, it is again noted that any desired communication interface may be utilized. It is further noted that VPD circuitry 290 may be implemented as a microcontroller (e.g., a Texas Instruments MSP430F55xx family of USB enabled 16-bit ultra-low power microcontrollers (such as the MSP430F5508), available from Texas Instruments of Dallas, Tex.) that runs firmware stored on a memory device associated with the microcontroller. Any other type of suitable pressure or displacement-sensing digital output circuitry may be employed including, for example, circuitry that uses RC discharge time to measure sensor capacitance as described in U.S. Pat. No. 3,936,674, which is incorporated herein by reference in its entirety.

It is also noted that the user configuration information 296 including VPD configuration profile information transmitted using packet-based VPDP communications across OUT communications 203 may be optionally stored in random access memory (RAM) or other volatile or non-volatile memory (NVM) storage that is associated with pressure or displacement sensing circuitry 290 (either internally or externally). Thus, configurable VPD sensor control parameters 296 may be stored, for example, on a RAM or NVM device in a keyboard, game controller, host system (e.g., on a hard drive) or other device and may provide a wide variety of configurable parameters that may be adjusted by a user and/or application using VPD protocol 175, e.g., through a VPD API as described further herein. It will be understood that single and/or multiple different user configuration files and/or multiple game (or application) configuration files may be stored allowing a user to select the applicable or desired keyboard configuration file depending on the game or application being used by the user and/or depending upon the particular user using the keyboard at the time, e.g., in a manner as described in U.S. patent application Ser. No. 12/316,703 filed Dec. 26, 2008, which is incorporated herein by reference in its entirety.

Figure 3:
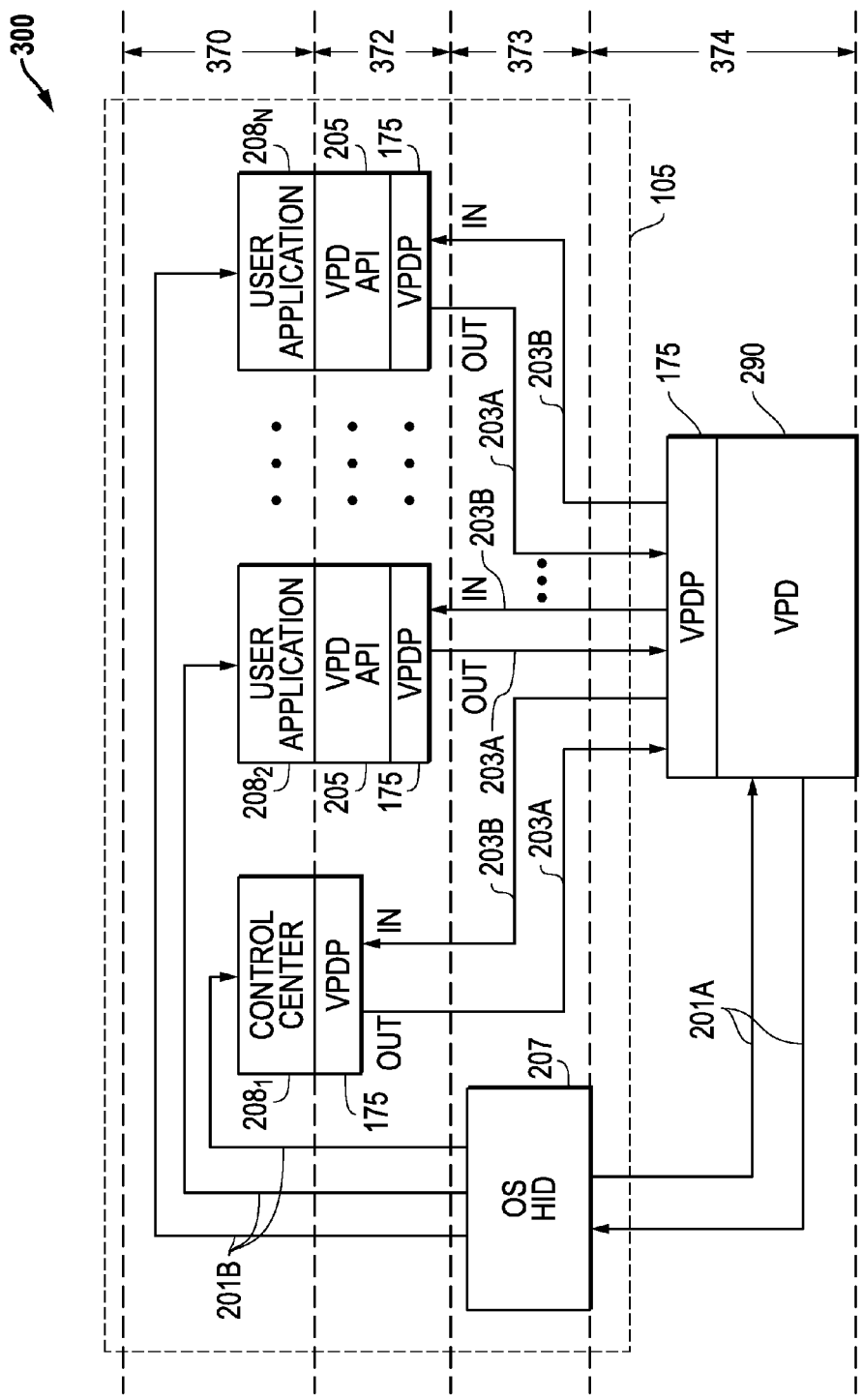
FIG. 3 is a block diagram illustrating operative relationship between a first host processing device communicatively coupled to a second VPD processing device of an information handling system according to one exemplary embodiment of the disclosed systems and methods.

FIG. 3 illustrates operative relationship 300 between a first host processing device 105 communicatively coupled to a second processing device of an information handling system 100 that is configured as VPD circuitry 290. As shown in FIG. 3, multiple applications $208_1$ to $208_N$ of an application layer 370 may be executed by host processing device 105, it being understood that only one or two applications 208 may alternatively be present in other embodiments. Applications 208 may be both VPD-enabled and non-VPD enabled applications and include, for example, a gaming control center $280_1$ (e.g., such as the Alienware Command Center (AWCC) available from Dell Computer of Round Rock, Tex.) as well as user applications $280_2$ to $280_N$ such as third party gaming applications, non-gaming applications, etc. In one exemplary embodiment, one or more of user applications $280_2$ to $280_N$ may be pre-configured with a corresponding VPD API 205 having VPD protocol 175 capability. As further shown in FIG. 3, it is possible that a given application such as gaming control center $280_1$ may be inherently capable of implementing packet-based VPDP communications without the need for a separate VPD API 205.

Each separate VPD protocol module 175 that is associated with hosted applications 208 (with or without VPD APIs 205) and with VPD circuitry 290 may include a VPDP listing of VPD commands and parameters together with their meanings (e.g., such as described and illustrated herein in relation to packet formats of FIGS. 4-13) in order to enable packet-based IN and OUT communications 203 as described further herein. In this regard, a VPDP listing (e.g., such as a look-up table) may be loaded by host processing device 105 with VPD APIs 205, e.g., from system storage 135. A similar stored VPDP listing may be accessed by VPD circuitry 290 on a NVM associated or otherwise accessible by VPD circuitry 290. In this embodiment, each of processing device of VPD circuitry 290 and the application/s 208 and/or APIs 205 executing on host processing device 105 have access to the same VPD listing information to enable the bi-directional packet-based communications 203 described herein.

In a further embodiment, each user application 208 may further be optionally configured upon installation on information handling system 100 for automatic or user-directed discovery of an underlying VPD hardware subsystem, e.g., that includes VPD circuitry 290 that is present on the information handling system. Upon such discovery, host processing device 105 may be configured to execute each user application 208 to enable communication using VPD protocol 175 with discovered VPD hardware subsystem components that include VPD circuitry 290. Once this communication is established, each user application 208 may then be capable of bi-directional communication with VPD circuitry 290 of the second processing device using VPD protocol 175 in a manner as described further herein.

As shown, each of multiple applications 208 may be coupled to bi-directionally communicate with VPD circuitry 290 of hardware layer 374 via VPD APIs 205 and VPD protocol 175 that may be present in a middleware layer 372 as shown. VPD protocol communication paths between each application 280 and the processing device of VPD circuitry 290 may be across any suitable type of communication interface path 203, e.g., such as USB, etc. As shown, bi-directional communication between each of application APIs 205 and VPD circuitry 290 may include OUT communications (e.g., as packet-based reports) 203A and IN communications (e.g., as packet-based reports) 203B.

For purposes of illustration only, OUT communications path 203A and IN communications path 203B are shown in FIG. 3 as extending through OS layer 373. However, it will be understood that OUT communications path 203A and IN communications path 203B are not available or reported to OS layer 373, but rather are direct communication paths extending between each separate application 280 and the processing device of VPD circuitry 290.

In one exemplary embodiment, one or more of APIs 205 may include a custom USB interface "IN" endpoint that may be selectively used as an alternative to OS HID driver 207 for receiving USB key codes from VPD sensor/s 204. In this regard, a given API 205 may be configured as a USB interface capable of understanding customized key codes provided by VPD circuitry 290 that are not understood by OS HID driver 207 and/or capable of generating unique key codes (e.g., such as a macro sequence including a combination of key codes) to provide to one or more hosted applications 208 in response to receipt of given key codes or other sensor information provided directly to the given API 205 from VPD circuitry 290.

In one exemplary embodiment, a given loaded hosted application may create its own a customized API 205 that may in turn advantageously receive and understand unique key code or other sensor information from VPD circuitry 290, and/or that may react to received key code or other sensor information in a unique manner (e.g., as specified by a third party developer of the given hosted application 208), so as to create a unique user application behavior that is not possible with OS HID driver 207. Further information on such an embodiment may be found described in relation to FIG. 12 herein.

Also shown present in FIG. 3 is optional Windows (or other OS) in-box USB HID driver 207 that may be executed in OS layer 373 by host processing device 105 to receive VPD pressure or displacement-based key codes 201A from VPD MCU 290 and to in turn provide VPD key codes 201B as VPD keyboard events 353 directly or indirectly to each of applications 208. In this regard, it will be understood that additional middleware components (e.g., such as a VPD macro selector component) may be optionally provided between OS HID driver 207 and each application to receive VPD key codes 201B from OS HID driver 207 and to provide modified VPD key codes based thereon to applications 208 (e.g., which may include VPD-enabled and non-VPD enabled applications). One example of a VPD key processing system architecture including various application layer, middleware layer, OS layer and hardware layer components with which the disclosed systems and methods may be implemented is described in U.S. patent application Ser. No. 13/232,707 filed Sep. 14, 2011 (U.S. Publication No. 2013-0067126), which is incorporated herein by reference in its entirety for all purposes.

FIGS. 4-13 illustrate various exemplary embodiments of VPD protocol packet formats for implementing IN communications 203A and OUT communications 203B of FIG. 3. In one exemplary embodiment, the various OUT protocol packets may be employed by a user and/or hosted application 208 to provide configuration information directly to VPD circuitry 290 via IN communications path 203A in order to configure desired response/s to particular sensor pressure or displacement levels. OUT protocol packets may also be employed by a user and/or hosted application 208 to request reporting of raw data directly from VPD circuitry 290 to one or more hosted applications 208 and/or to control operational mode of VPD circuitry 290.

In one exemplary embodiment, the commands and parameters of the illustrated VPD packet formats may be selected and inserted into individual packets based on configuration information entered by a user, e.g., using a graphical user interface (GUI) associated with a given application 208 that is displayed on display 125 of system 100. For example, a user may use such a GUI or other suitable I/O interface to create user configuration profile for a given sensor by entering a desired number of pressure or displacement ranges, as well as the starting and ending pressure or displacement values for each pressure or displacement range of the given sensor, and the desired behavioral response for each such pressure range. A VPDP module 175 associated with the application 208 (with a corresponding API 205 when needed) may then access a VPDP listing of VPD commands and parameters and select the appropriate commands and parameters to create one or more corresponding OUT VPDP protocol packets for communication to VPDP circuitry 290 across OUT communications path 203A to create a corresponding user profile that is stored and utilized by VPD circuitry 290.

It will be understood that the particular illustrated packet formats are exemplary only and that different packet formats may be employed in other embodiments (e.g., having greater or fewer number of bytes, and/or having different defined parameters or defined order of parameters). Moreover the particular illustrated selectable VPD profile configuration modes, VPD commands, and transmitted VPD raw data types of the packet formats illustrated FIGS. 4-13 are exemplary only, it being understood that any other type/s of profile configuration information, commands and/or raw data may be additionally or alternatively communicated across bi-directional communication paths 203 using one or more VPD protocol packet formats having other selected byte lengths and/or VPD parameters.

FIGS. 4-6 illustrate one exemplary embodiment of VPD user configuration profile information that may be communicated in variable size VPD protocol packet formats 400, 500 and 600 across OUT communication path 203A from a given hosted application 208 to a processing device of VPD circuitry 290 using packet-based VPD protocol 175. Such a VPD configuration profile may specify, for example, the correlation of one or more given pressure or displacement levels to one or more corresponding unique key or other type of sensor codes, with multiple pressure or displacement levels being supported. In one exemplary embodiment, a VPD configuration profile may include settings specifying how VPD sensor/s 204 shall behave for a given application 208 (e.g., game, Microsoft Office application, etc.) by defining different output signal behaviors for VPD circuitry 290 that each correspond to each of multiple different defined ranges of real time pressure or displacement applied to a given VPD sensor 204. Thus, behavior of the VPD sensor/s 204 as a function of pressure or displacement may be customized for any given application 208, it being understood that multiple different VPD configuration profiles may be communicated from various different applications 208 as needed or desired to so support corresponding multiple applications 208. In one exemplary embodiment, a control center application $208_1$ or other type of application $208_2$ to $208_N$ may be configured as a component that is accessible to the user of information handling system 100 in the form of an interactive GUI application on display 125. Using the application 208, a user may in real time create, maintain, store and enable VPD configuration profiles customized for each different application 208 and/or combinations of applications 208, e.g., in volatile or non-volatile memory storage that is associated with pressure or displacement sensing circuitry 290 (either internally or externally) as previously described.

In particular, each of VPD protocol packet formats 400, 500 and 600 include parameters that may be used to assign individual VPD sensors 204 a specific corresponding VPD mode of operation (e.g., behavior). In one exemplary embodiment, this mode assignment may become persistent until another VPD configuration profile is assigned by transmitting another VPD protocol packet that corresponds to another mode of operation. In this example, VPD protocol packet formats 400, 500 and 600 correspond to the following three respective VPD modes: Normal Mode, Rapid Fire Mode, and Dual Function Mode. Using the disclosed VPD protocol, any VPD sensor 204 may be individually assigned to any one of these available modes of this embodiment by transmitting a corresponding packet format across OUT communication path 203A to processing device of VPD circuitry 290. Moreover, users and/or applications 208 may be allowed to reconfigure in real time the behavior associated with each VPD sensor 204 as desired to achieve a personal gratifying experience with applications of interest by transmitting a different packet format across OUT communication path 203A that corresponds to a new operation mode for a given VPD sensor 204. It will be understood that the illustrated particular VPD modes corresponding to packet formats 400, 500 and 600 are exemplary only, and that fewer, additional and/or alternative VPD modes may be made available in other exemplary embodiments by providing other selectable VPD protocol packet formats.

FIG. 4 illustrates an OUT report packet format 400 that may be employed to assign a normally expected sensor behavior (e.g., normal on/off digital keyboard key behavior) to one or more of specified VPD sensors 204. For example, in one exemplary embodiment of a normal mode for a USB keyboard, when a VPD sensor key is depressed, VPD circuitry 290 may generate a corresponding USB Usage Page key code for that pressed keyboard key that exhibits the behavior of a digital key in a digital keyboard matrix. In such an embodiment, all USB key codes may be output via a standard keyboard HID interface to a OS HID stack for processing. Packet format 400 may be repeated in back-to-back manner for each desired VPD sensor to set the normal mode for as many sensors 204 as is desired, and this combined packet information transmitted together as a variable size packet to processing device of VPD circuitry 290. As shown, the first byte 402 of normal mode packet format includes beginning command byte "0x01" specifying the normal mode packet format, followed by the second byte 404 which may contain a key or other type of sensor identifier to identify a given VPD sensor 204. In one example, sensor identifier 404 may be a HID Keyboard usage code for one of the available VPD sensor/s 204 of a given VPD configuration for which the normal sensor behavior mode is desired, such as one of W, A, S, D or 4 arrow keys of a QWERTY keyboard in one exemplary embodiment. For example, second byte 404 (as well as key or sensor codes of other VPDP packet bytes of FIGS. 4-13) may contain a USB key code selected from Microsoft USB Usage Page and assigned to the given sensor 204. Alternatively, a specific key identifier code (e.g., such as "0xFF") may also be provided and used to set all available VPD sensors 204 to the normal behavior mode. As shown, the remaining bytes 404-416 of packet format 400 are set as "0".

FIG. 5 illustrates an OUT report packet format 500 that may be employed to assign a rapid fire sensor behavior to one or more of specified VPD sensors 204 (e.g., to associate a different particular key code repetition rate for each different specified pressure or displacement range sensed for a specified VPD key). In the illustrated exemplary embodiment, "0x02" of byte 502 is a command code that may be used to specify the rapid fire mode packet format to follow. Byte 504 contains a key or other type of sensor identifier, which as before may be a selected HID Keyboard usage code or other suitable key identifier for one of the available VPD sensor/s 204 (e.g., one of W, A, S, D or 4 arrow keys of a QWERTY keyboard). Byte 506 contains an integer that specifies the total number of one or more pressure or displacement ranges to be defined for the sensor identified in byte 504. Byte 508 contains an ascending integer value that identifies each pressure or displacement range, beginning with the number 1 as illustrated in FIG. 5. Byte 510 contains the most significant byte value and byte 512 contains the least significant bit value for the selected starting (i.e., minimum) pressure or displacement level (e.g., 12 bit A/D counts) for the current specified pressure or displacement range of byte 508. Likewise, byte 514 contains the most significant byte value and byte 516 contains the least significant bit value for the selected ending (i.e., maximum) pressure or displacement level (e.g., 12 bit A/D counts) for the current specified pressure or displacement range of byte 508.

Still referring to FIG. 5, byte 518 may contain an optional bitwise modifier field that may be selected to specify other behavior (e.g., such as dual function mode described below) that may be initiated by simultaneously pressing a modifier key (e.g., such as one or more of Shift, Ctrl, Alt, etc. keys) or other type of sensor identified in byte 520 (e.g., by USB usage code from the HID Keyboard Page table) together with the sensor identified in byte 504. Byte 518 may be given value of "0" where no such sensor modifier option is desired. A sensor rate repetition rate (e.g., repetition rate of the key code produced by VPD circuitry 290) may be specified in byte 522 for the pressure or displacement range specified in byte 508. In byte 524, the next ascending pressure or displacement range integer may be identified for the sensor identified in byte 504, and the selected starting and ending pressure or displacement levels for the range identified in byte 524 may be provided in bytes 526 to 532 and so on in a manner similar to the previous range so as to repeat the packet pattern as represented by the dots in the packet bytes 526 to 532. The eight byte packet format may repeat a variable number of times in similar manner until parameters for all pressure or displacement ranges corresponding to the number of ranges specified in byte 506 have been entered. A similar VPD packet format 500 may be repeated to assign rapid fire mode behavior to as many other sensors 204 as desired by identifying each different sensor in byte 504 after a corresponding "0x02" of the next byte 502.

As an example of rapid fire mode behavior that may be assigned by an application 208 using packet format 500, a given sensor 204 (e.g., key or button) may be assigned a USB Usage key code 04 (ASCII character A) in byte 504 and selected to repeat 10 times per second (per rate specified in byte 522) for pressure sensing range 1 of byte 508 (i.e., as by values in bytes 510-516), and repeat at 20 times per second for pressure sensing range 2 (i.e., as defined by values in bytes 526-532). Upon receipt of the information of a given rapid fire OUT report packet format 500 communicated across communication path 203A from a given application 208, the processing device of VPD circuitry 290 is configured to respond by implementing the rapid fire behavior specified by packet format 500. For example, in one exemplary embodiment, all repeating USB key codes may be output from VPD circuitry 290 using a standard keyboard HID interface to an OS HID stack 207 executing on host processing device 105 for further processing.

FIG. 6 illustrates an OUT report packet format 600 that may be employed to assign a dual function mode behavior to one or more of specified VPD sensors 204 (e.g., to associate a different output key code identity with each different individual specified pressure or displacement range sensed for a given specified VPD key). In the illustrated exemplary embodiment, "0x03" of byte 602 is a command code that may be used to specify the dual function mode packet format to follow. Byte 604 contains a key or other type of sensor identifier, which as before may be a selected HID Keyboard usage code or other suitable sensor identifier for one of the available VPD sensor/s 204. Byte 606 contains an integer that species the total number of one or more pressure or displacement ranges to be defined for the sensor identified in byte 604. Similar to rapid fire packet mode 500, byte 608 contains an ascending integer value that identifies each pressure or displacement range, beginning with the number 1 as illustrated in FIG. 5. Byte 610 contains the most significant byte value and byte 612 contains the least significant bit value for the selected starting (i.e., minimum) pressure or displacement level (e.g., 12 A/D bit counts) for the specified pressure or displacement range of byte 508. Likewise, byte 614 contains the most significant byte value and byte 616 contains the least significant bit value for the selected ending (i.e., maximum)

pressure or displacement level (e.g., 12 A/D bit counts) for the specified pressure or displacement range of byte 608.

Still referring to dual function mode packet format 600 of FIG. 6, byte 618 contains an optional bitwise modifier field that may be selected to specify other behavior that will be initiated by simultaneously pressing a specified modifier key (e.g., such as one or more of Shift, Ctrl, Alt, etc. keys) or other type of sensor identified in byte 620 (e.g., by USB usage code from the HID Keyboard Page table) together with the key or other type of identified in byte 604. In byte 622, the next ascending pressure or displacement range integer may be identified for the sensor identified in byte 604, and the selected starting and ending pressure or displacement levels for the range identified in byte 622 may be provided in bytes 624 to 630 and so on in a manner similar to the previous range. As before, the eight byte packet format may repeat a variable number of times in similar manner until parameters for all pressure or displacement ranges corresponding to the number of ranges specified in byte 606 have been entered. A similar VPD packet format 600 may be repeated to assign rapid fire mode behavior to as many other sensors 204 as desired by identifying each different sensor in byte 604 after a corresponding "0x03" of the next byte 602.

As an example of dual function mode behavior that may be assigned by an application 208 using packet format 600, a given sensor 204 identified in byte 604 may be assigned a USB Usage key code 04(ASCII A)+CNTRL+ALT in bytes 618 and 620 for sensed pressure or displacement range 1 of byte 608 (i.e., defined by values in bytes 610-616), and also assigned a USB Usage key code 29(ASCII Z)+ALT in bytes 624-630 for sensed pressure of displacement range 2 of byte 622 (i.e., defined by values in byte 632 and the following sequential byte not shown in FIG. 6). Thus, when a user depresses the sensor 204 identified by byte 604 within the sensed pressure or displacement zone 1, the processing device of VPD circuitry 290 will output the combination CNTRL+ALT+A, and when a user depresses the sensor 204 identified by byte 604 within the sensed pressure or displacement zone 2, the processing device of VPD circuitry 290 will output ALT+Z. Once again, in this mode all USB key codes may be output from VPD circuitry 290 using a standard keyboard HID interface to an OS HID stack 207 executing on host processing device 105 for further processing.

In one exemplary embodiment, an available VPD sensor 204 may be alternately assigned a reserved USB usage key code or other type of sensor identifier in byte 620 of OUT report packet format 600 for the purpose of triggering particular user or user-defined macros configured within a given application 208 which may be, for example, a multi-key sequence to be triggered upon particular sensor pressure level sensed. In such an exemplary embodiment, a processing device of VPD circuitry 290 may be configured to implement a vendor-defined (or custom) HID interface that is only accessible to applications 208, e.g., and in one embodiment not accessible to any OS executing on host processing device 105 of an information handling system 100. In one particular implementation, the assigned reserved USB Usage key code/s 620s may be output by this custom interface to one or more receiving applications 208 which in turn launch the macro/s. In another exemplary embodiment, the assigned reserved USB Usage key code/s 620s may be output by this custom interface to a control center application 208 that itself may look up any macros corresponding to the so-transmitted reserved USB Usage key code/s 620, and launch the macro/s to other applications 208, e.g., via an API communication path from the control center application 208 to a user application/s 208.

Figure 7:
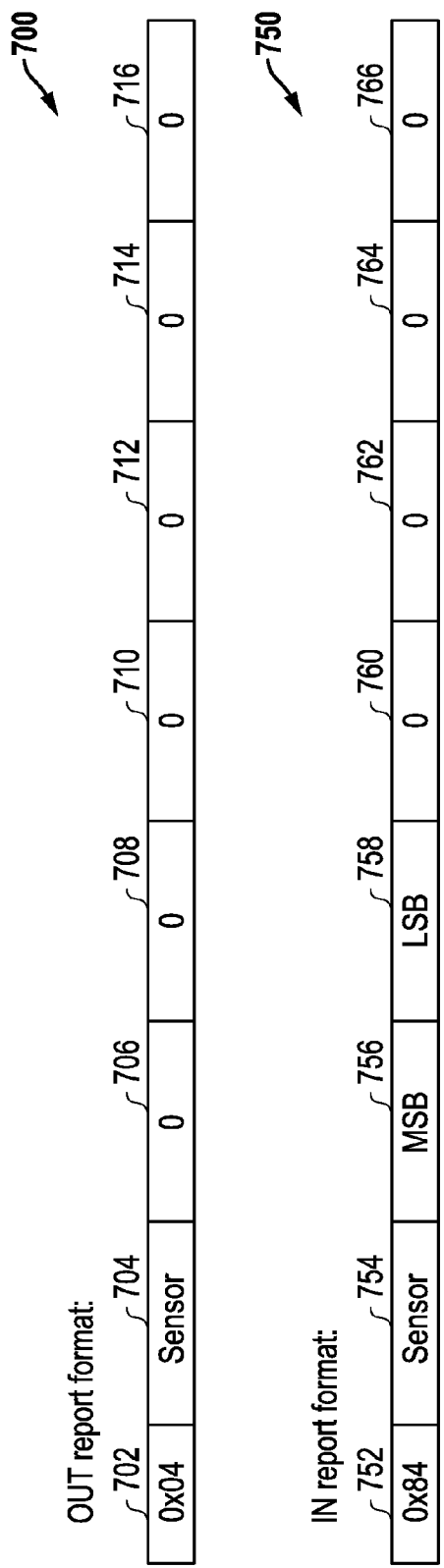
FIG. 7 illustrates a VPD protocol packet format according to one exemplary embodiment of the disclosed systems and methods.

FIG. 7 illustrates an OUT report packet format 700 that may be employed by any given hosted application 208$_x$ of applications 208$_1$ to 208$_N$ (e.g., Windows or Linux application) to request real-time raw pressure or displacement sensing data that is generated as a user puts varying pressure or displacement on a selected VPD sensor 204. Packet format 700 includes "0x04" in byte 702 to indicate the OUT report packet raw data request format to follow, which includes byte 704 that contains a key or other type of sensor identifier, which as before may be a selected HID Keyboard usage code or other suitable key or other type identifier for one of the available VPD sensor/s 204. Remaining bytes 706-716 may be unused as shown. FIG. 7 also illustrates IN report packet format 750 that is returned to the requesting hosted application 208$_x$ by processing device of VPD circuitry 290 in response to receipt of OUT packet 700 from the given hosted application 208$_x$. As shown, OUT packet report 750 includes "0x84" in byte 752 to indicate that raw pressure or displacement data is to follow for the sensor identified in byte 754, which corresponds to the sensor identified in byte 704 of OUT packet 700. Byte 756 contains the most significant byte value and byte 758 contains the least significant bit value (e.g., such as grams of pressure or millimeters of displacement) for the raw pressure or displacement level (or value representative of such a level) currently sensed in real time by the VPD circuitry 290 for the given sensor identified in bytes 704 and 754, with remaining bytes 760-766 of packet 750 being unused as shown. Once the raw pressure or displacement data is so returned to requesting hosted application 208$_x$, sensor pressure or displacement event reporting may return to normal operation.

FIGS. 8 and 9 illustrate OUT packet formats that may be employed by any given hosted application 208$_x$ to request current VPD configuration status information (e.g., such as current VPD circuitry firmware version, current assigned sensor behavior or configuration mode, current pressure ranges and/or key codes/macros assigned to a given sensor, etc.). For example, FIG. 8 illustrates an OUT report packet format 800 that may be employed by any given hosted application 208$_x$ to request the current configuration mode of a given VPD sensor 204. Packet format 800 includes "0x05" in byte 802 to indicate the OUT report packet configuration mode request format to follow, which includes byte 804 that contains a key or other type of sensor identifier for one of the available VPD sensor/s 204. Remaining bytes 806-716 may be unused as shown. FIG. 8 also illustrates IN report packet format 750 that is returned to the requesting hosted application 208$_x$ by processing device of VPD circuitry 290 in response to receipt of OUT packet 800 from the given hosted application 208$_x$. As shown, OUT packet report 850 includes "0x85" in byte 852 to indicate that configuration mode information is to follow for the sensor identified in byte 854, which corresponds to the sensor identified in byte 804 of OUT packet 800. Byte 856 contains a mode code that corresponds to the sensor identified in byte 854, e.g., such as "1" for normal digital on/off key mode, "2" for rapid fire mode, "3" for dual function mode, etc., with remaining bytes 860-866 of packet 850 being unused as shown FIG. 9 illustrates an OUT report packet format 900 that may be employed by any given hosted application 208$_x$ of applications 208$_1$ to 208$_N$ to request the current firmware version of VPD circuitry 290. Packet format 900 includes "0x06" in byte 902 to indicate an OUT report packet firmware version request format. Remaining bytes 904-916 may be unused as shown. FIG. 9 also illustrates IN report packet format 950 that is returned to the requesting hosted application 208$_x$ by processing device of VPD circuitry 290 in response to receipt of OUT packet 900 from the given hosted application 208$_x$. As shown, OUT packet report 950 includes "0x86" in byte 952 to indicate that current VPD firmware version identifier is to follow. Byte 954 contains the most significant byte value and byte 956 contains the least significant bit value, e.g., "0x0101" may be used to identify firmware version "1.0.1".

FIG. 10 illustrates an OUT report packet format 1000 that may be employed by any given hosted application 208$_x$ of applications 208$_1$ to 208$_N$ to request VPD circuitry 290 to invoke a bootloader on VPD circuitry 290 in order to update of the VPD firmware of VPD circuitry 290, e.g., when required or needed by the application 208$_x$ for proper operation on system 100. In this embodiment, packet 1000 employs "0x07" in byte 1002 to indicate this particular OUT report packet request. Remaining bytes 1004-1016 may be unused as shown. In this embodiment, VPD circuitry 290 may respond to receipt of OUT report packet format 1000 by invoking its bootloader and updating VPD firmware of circuitry 290 independently of the operation of the remaining components of information handling system 100.

FIG. 11 illustrates an OUT report packet format 1100 that may be employed by any given hosted application 208$_x$ of applications 208$_1$ to 208$_N$ to request VPD circuitry 290 to toggle general purpose input/output (GPIO) output signals received from VPD sensors 204 to keyboard controller 110 (or alternatively BIOS/embedded controller 180) via signal path 151 rather than as VPD keyboard events in the form of scan or key codes 201. This OUT report packet format therefore may be used to toggle control of the VPD sensors 204 between VPD circuitry 290 and digital on/off keyboard controller 110 (or embedded controller 180 in another embodiment). In this embodiment, packet 1100 employs "0x08" in byte 1102 to indicate VPD sensor output control mode report packet information is to follow. Byte 1104 includes a mode code to control toggling control between VPD circuitry 290 and keyboard controller 110 or embedded controller/BIOS 147. For example, an integer value of "1" may be provided in byte 1104 to request keyboard controller/embedded controller/BIOS control of all VPD sensors 204, while an integer value of "2" may be provided in byte 1104 to request VPD circuitry control of all VPD sensors 204 in which case keyboard controller/embedded controller/BIOS ignores pressing of VPD sensors 204. Remaining bytes 1106-1116 may be unused as shown.

Alternatively, one or more of bytes 1106-1116 may be used to specify a subset of one or more sensors 204 for control by VPD circuitry 290, and another different subset of one or more sensors 204 for control by keyboard controller/embedded controller/BIOS.

FIG. 12 illustrates an OUT report packet format 1200 that may be employed by any one or more given hosted applications 208 to request VPD circuitry 290 to send pressure or displacement-based key or other sensor code information directly to a customized "IN" endpoint of an API 205 that is accessible to the given hosted applications 208 rather than to OS HID 207. Each of the one or more given requesting hosted applications 208 may then retrieve the corresponding key codes from the customized "IN" endpoint of the API 205 by polling the endpoint. As shown, packet format 1200 includes "0x09" in byte 1202 to indicate a request for sending key codes to a customized "IN" endpoint is to follow. The remaining bytes 1204-1216 may be unused as shown. Alternatively, one or more of bytes 1204-1116 may be used to specify a subset of one or more sensors 204 for which VPD circuitry 290 is requested to send key or sensor code information directly to customized "IN" endpoint.

FIG. 12 also illustrates IN report packet format 1250 that is returned to the requesting hosted application/s 208 by processing device of VPD circuitry 290 in response to receipt of OUT packet 1200 from the requesting hosted application/s 208. As shown, OUT packet report 1250 includes "0x89" in byte 1252 to indicate that key code information is to follow, and byte 1254 contains a key or other sensor code corresponding to a given pressed VPD sensor 204. The receiving "IN" endpoint may then interpret and/or produce a given key code or other type of coded response that is provided to the requesting hosted application 208, e.g., as a specified and/or customized pre-defined set of one or more key or sensor code/s (e.g., such as a macro key code sequence, dual function key code behavior, or other customized response) to cause a unique response by the requesting hosted application 208 that would not be otherwise possible based on routing of the key or sensor code of byte 1254 through OS HID 207.

FIG. 13 illustrates an OUT report packet format 1300 that may be employed by any one or more given hosted applications 208 to request VPD circuitry 290 to stop sending pressure or displacement-based key or other sensor code information directly to a customized "IN" endpoint of an API 205, e.g., to disable the mode enabled by OUT packet format 1200 of FIG. 12. As shown, byte 1302 of packet 1300 includes "0x0A" in byte 1302 to request that the mode of FIG. 12 be disabled. Other bytes 1304-1316 may be unused as shown.

It will be understood that the particular packet formats and modes of FIGS. 4-13 are exemplary only, and that other packet configurations and modes may be alternatively employed and implemented using the disclosed systems and methods. For example, packets of greater or lesser lengths and/or packets that include different command and/or parameter values in the various bytes of the packet formats may be employed as required or desired to fit the characteristics of a given VPD system implementation. Moreover, it also possible that additional or alternative modes and/or parameters may be communicated using the IN and OUT communications 203A and 203B described herein.

It will also be understood that one or more of the tasks, functions, or methodologies described herein (e.g., including those described herein for components 105, 290, etc.) may be implemented, for example, as software, firmware or other computer program of instructions embodied in a non-transitory tangible computer readable medium that is executed by a CPU, controller, microcontroller, processor, microprocessor, FPGA, ASIC, or other suitable processing device or combination of such processing devices.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. An information handling system, comprising:
variable pressure or displacement (VPD) circuitry that includes a first processing device configured to receive a sensor output signal from at least one VPD sensor that includes raw sensor data that is representative of the real time pressure or displacement being applied to the VPD sensor, the first processing device being configured to process the raw sensor data of the received VPD sensor output signal according to VPD configuration parameters to produce at least one VPD circuitry output signal that is based on an identity and a real time level of pressure or displacement being applied to the VPD sensor; and
a second processing device that is configured as a host processing device to execute at least one application to exchange information and data with the first processing device using bi-directional packet-based communications that are not made available to or reported to an operating system (OS) executing on the host processing device;
where the second processing device is configured to execute the at least one application to use the packet-based communications to communicate VPD commands to the first processing device that request the first processing device to take one or more reporting or processing actions, and to use the packet-based communications to communicate VPD configuration instructions to the first processing device to control the manner in which the first processing device processes the raw sensor data of the received VPD sensor output signal; and
where the first processing device is configured to use the packet-based communications to communicate the raw sensor data of the VPD sensor output signal to the application executing on the second processing device, and to use the packet-based communications to communicate current VPD configuration status information to the application executing on the second processing device.

2. The information handling system of claim 1, where the second processing device is configured to execute the at least one application to use the packet-based communications to communicate VPD configuration instructions to the first processing device to instruct the first processing device to process the raw sensor data of the received VPD sensor output signal using a selected one of multiple available processing modes; and where the first processing device is configured to respond to the VPD configuration instructions received from the first processing device by processing the raw sensor data of the received VPD sensor output signal using the selected one of multiple available processing modes.

3. The information handling system of claim 2, where the multiple processing modes of the first processing device comprise a normal digital on/off output mode, a rapid fire output mode, and a dual function output mode.

4. The information handling system of claim 1, where the second processing device is configured to execute the at least one application to use the packet-based communications to communicate VPD configuration instructions that include one or more parameters to be used by the first processing device to process the raw sensor data of the received VPD sensor output signal; and where the first processing device is configured to respond to the VPD configuration instructions received from the first processing device by using the one or more parameters to process the raw sensor data of the received VPD sensor output signal.

5. The information handing system of claim 4, where the one or more parameters of the VPD configuration instructions comprise multiple different defined pressure ranges of real time pressure or displacement applied to the VPD sensor, and different respective defined VPD circuitry output signal behaviors corresponding to each of the multiple different defined pressure ranges of real time pressure or displacement applied to the VPD sensor; and where the first processing device is configured to respond to the VPD configuration instructions received from the first processing device by processing the raw sensor data of the received VPD sensor output signal to produce a different defined VPD circuitry output signal behavior based upon which one of the multiple different defined pressure ranges includes the real time level of pressure or displacement being applied to the VPD sensor currently falls.

6. The information handling system of claim 1, where the second processing device is configured to execute the at least one application to use the packet-based communications to communicate a VPD command to the first processing device requesting that the first processing device communicate the real time raw sensor data of the VPD sensor output signal to the application executing on the second processing device; and where the first processing device is configured to respond to the VPD command by using the packet-based communications to communicate the real time raw sensor data of the VPD sensor output signal to the application executing on the second processing device.

7. The information handling system of claim 1, where the second processing device is configured to execute the at least one application to use the packet-based communications to communicate a VPD command to the first processing device requesting that the first processing device communicate current configuration status information of the first processing device to the application executing on the second processing device; and where the first processing device is configured to respond to the VPD command by using the packet-based communications to communicate the requested current configuration status information of the first processing device to the application executing on the second processing device.

8. The information handling system of claim 1, further comprising a third processing device configured as a digital on/off keyboard controller coupled between the first processing device and the second processing device; where the first processing device is configured to selectably communicate a digital on/off sensor signal corresponding to raw sensor data received from a currently-pressed VPD sensor to the third processing device in response to VPD commands received from the application executing on the second processing device; and where the second processing device is configured to execute the at least one application to use the packet-based communications to communicate VPD commands to the first processing device to request that the first processing device either output the digital on/off signal to the third processing device or output the VPD circuitry output signal to the second processing device.

9. The information handling system of claim 1, where the second processing device is configured to execute a signal interface outside any OS executing on the second processing device and that is coupled between the application and the bi-directional packet communication path, the signal interface being configured to receive VPD circuitry output signals for the application; and where the second processing device is configured to execute the at least one application to use the packet-based communications to communicate a VPD command to the first processing device requesting that the first processing device communicate VPD circuitry output signals directly to the at least one application; and where the first processing device is configured to respond to the request received from the application that the first processing device communicate VPD circuitry output signals directly to the at least one application by communicating VPD circuitry output signals directly to the at least one application by a communication path that is not available or accessible to the OS executing on the second processing device.

10. The information handling system of claim 1, where the second processing device is configured to execute the at least one application to use the packet-based communications to communicate a VPD command to the first processing device requesting that the first processing device invoke a bootloader; and where the first processing device is configured to respond to the bootloader request by invoking the bootloader to update firmware for the first processing device.

11. The information handling system of claim 1, where the second processing device is configured to execute the at least one application to exchange the information and data through an application programming interface (API) using the bi-directional packet-based communications.

12. The information handling system of claim 11, where the packet-based communications comprise a defined set of VPD commands and VPD parameters that are selectable for communication across the bi-directional communication path between the first processing device and the second processing device; where the first processing device is configured to access a stored listing of the defined set of VPD commands and VPD parameters to enable communicating and receiving of the bi-directional packet-based communications; and where the API executed by the second processing device includes a listing of the defined set of VPD commands and VPD parameters to enable communicating and receiving of the bi-directional packet-based communications.

13. The information handling system of claim 12, where the second processing device is configured to load and execute the at least one application to discover the presence of the second processing device; and to execute the API of the at least one application to establish the bi-directional packet-based communications with the second processing device upon discovery of the presence of the second processing device.

14. A method of operating an information handling system, comprising:
receiving a sensor output signal in a first processing device of variable pressure or displacement (VPD) circuitry from at least one VPD sensor that includes raw sensor data that is representative of the real time pressure or displacement being applied to the VPD sensor;
using the first processing device to process the raw sensor data of the received VPD sensor output signal according to VPD configuration parameters to produce at least one VPD circuitry output signal that is based on an identity and a real time level of pressure or displacement being applied to the VPD sensor;
using a second processing device that is configured as a host processing device to execute at least one application to:
exchange information and data with the first processing device using bi-directional packet-based communications that are not made available to or reported to an operating system (OS) executing on the host processing device,
use the packet-based communications to communicate VPD commands to the first processing device that request the first processing device to take one or more reporting or processing actions, and
use the packet-based communications to communicate VPD configuration instructions to the first processing device to control the manner in which the first processing device processes the raw sensor data of the received VPD sensor output signal; and
using the first processing device to use the packet-based communications to:
communicate the raw sensor data of the VPD sensor output signal to the application executing on the second processing device, and
communicate current VPD configuration status information to the application executing on the second processing device.

15. The method of claim 14, further comprising using the second processing device to execute the at least one application to use the packet-based communications to communicate VPD configuration instructions to the first processing device to instruct the first processing device to process the raw sensor data of the received VPD sensor output signal using a selected one of multiple available processing modes; and using the first processing device to respond to the VPD configuration instructions received from the first processing device by processing the raw sensor data of the received VPD sensor output signal using the selected one of multiple available processing modes.

16. The method of claim 15, where the multiple processing modes of the first processing device comprise a normal digital on/off output mode, a rapid fire output mode, and a dual function output mode.

17. The method of claim 14, further comprising using the second processing device to execute the at least one application to use the packet-based communications to communicate VPD configuration instructions that include one or more parameters to be used by the first processing device to process the raw sensor data of the received VPD sensor output signal; and using the first processing device to respond to the VPD configuration instructions received from the first processing device by using the one or more parameters to process the raw sensor data of the received VPD sensor output signal.

18. The method of claim 17, where the one or more parameters of the VPD configuration instructions comprise multiple different defined pressure ranges of real time pressure or displacement applied to the VPD sensor, and different respective defined VPD circuitry output signal behaviors corresponding to each of the multiple different defined pressure ranges of real time pressure or displacement applied to the VPD sensor; and where the method further comprises using the first processing device to respond to the VPD configuration instructions received from the first processing device by processing the raw sensor data of the received VPD sensor output signal to produce a different defined VPD circuitry output signal behavior based upon which one of the multiple different defined pressure ranges includes the real time level of pressure or displacement being applied to the VPD sensor currently falls.

19. The method of claim 14, further comprising using the second processing device to execute the at least one application to use the packet-based communications to communicate a VPD command to the first processing device requesting that the first processing device communicate the real time raw sensor data of the VPD sensor output signal to the application executing on the second processing device; and using the first processing device to respond to the VPD command by using the packet-based communications to communicate the real time raw sensor data of the VPD sensor output signal to the application executing on the second processing device.

20. The method of claim 14, further comprising using the second processing device to execute the at least one application to use the packet-based communications to communicate a VPD command to the first processing device requesting that the first processing device communicate current configuration status information of the first processing device to the application executing on the second processing device; and using the first processing device to respond to the VPD command by using the packet-based communications to communicate the requested current configuration status information of the first processing device to the application executing on the second processing device.

21. The method of claim 14, further comprising using the first processing device to selectably communicate a digital on/off sensor signal corresponding to raw sensor data received from a currently-pressed VPD sensor to a third processing device in response to VPD commands received from the application executing on the second processing device; and using the second processing device to execute the at least one application to use the packet-based communications to communicate VPD commands to the first processing device to request that the first processing device either output the digital on/off signal to the third processing device or output the VPD circuitry output signal to the second processing device; where the third processing device is configured as a digital on/off keyboard controller coupled between the first processing device and the second processing device.

22. The method of claim 14, further comprising using the second processing device to execute a signal interface outside any OS executing on the second processing device and that is coupled between the application and the bi-directional packet communication path, the signal interface being configured to receive VPD circuitry output signals for the application; using the second processing device to execute the at least one application to use the packet-based communications to communicate a VPD command to the first processing device requesting that the first processing device communicate VPD circuitry output signals directly to the at least one application; and using the first processing device to respond to the request received from the application that the first processing device communicate VPD circuitry output signals directly to the at least one application by communicating VPD circuitry output signals directly to the at least one application by a communication path that is not available or accessible to the OS executing on the second processing device.

23. The method of claim 14, further comprising using the second processing device to execute the at least one application to use the packet-based communications to communicate a VPD command to the first processing device requesting that the first processing device invoke a bootloader; and where the first processing device is configured to respond to the bootloader request by invoking the bootloader to update firmware for the first processing device.

24. The method of claim 14, further comprising using the second processing device to execute the at least one application to exchange the information and data through an application programming interface (API) using the bi-directional packet-based communications.

25. The method of claim 24, where the packet-based communications comprise a defined set of VPD commands and VPD parameters that are selectable for communication across the bi-directional communication path between the first processing device and the second processing device; where the API executed by the second processing device that includes a listing of the defined set of VPD commands and VPD parameters; and where the method further comprises:
  using the first processing device to access a stored listing of the defined set of VPD commands and VPD parameters to enable communicating and receiving of the bi-directional packet-based communications; and
  using the second processing device to execute the API to use the listing of the defined set of VPD commands and VPD parameters to enable communicating and receiving of the bi-directional packet-based communications.

26. The method of claim 25, further comprising using the second processing device to load and execute the at least one application to:
  discover the presence of the second processing device; and
  execute the API of the at least one application to establish the bi-directional packet-based communications with the second processing device upon discovery of the presence of the second processing device.

* * * * *